Aug. 4, 1959
F. T. ROBERTS ET AL
2,897,839
HOSE
Original Filed April 4, 1956
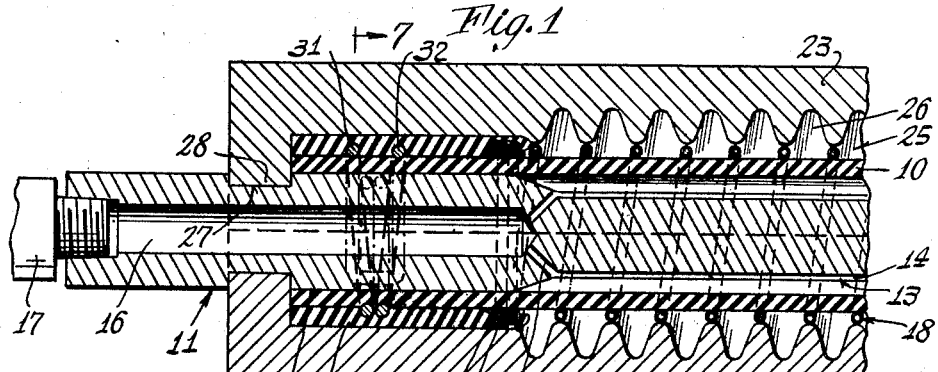
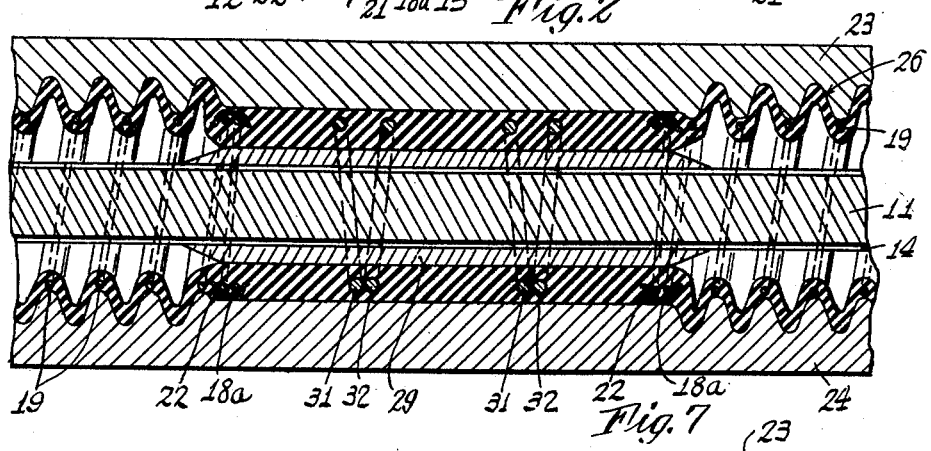
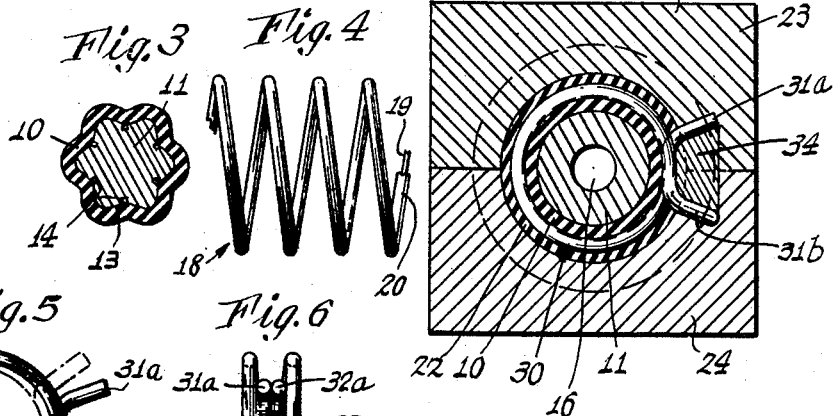
INVENTOR.
Fred T. Roberts
Robert E. Roberts
BY Johnson and Kline
ATTORNEYS

United States Patent Office 2,897,839
Patented Aug. 4, 1959

2,897,839

HOSE

Fred T. Roberts and Robert E. Roberts, Wilton, Conn.

Original application April 4, 1956, Serial No. 576,055, now Patent No. 2,779,976, dated February 5, 1957. Divided and this application July 16, 1956, Serial No. 598,092

7 Claims. (Cl. 138—56)

This invention relates to flexible hose and more particularly to molded flexible hose having a helically corrugated body provided with a reenforcing means secured in the troughs of the corrugations of the body.

It is an object of the present invention to provide a hose construction in which a helical reenforcing means is disposed in the troughs of the body to control the expansion and compression of the hose, yet permitting the crest portions of the corrugations to be freely flexed in the elongation and contraction of the hose.

A still further object of the invention is to provide a hose having a novel attaching portion provided with a clamp means whereby the hose can be readily connected to a conduit or the like.

A feature of the invention resides in the molding of the clamping structure into the body of the attaching portion of the hose while in expanded relation and which when contracted to normal size urges the attaching portion into sealing relation with a connector to which the hose is to be connected.

This application is a division of our application Serial No. 576,055 filed April 4, 1956, now Patent No. 2,779,976 issued February 5, 1957.

Other features and advantages of the invention will be apparent from the specification and claims when considered in connection with the drawings in which:

Figure 1 shows a mold with the mandrel and hose body positioned therein prior to the molding operation.

Fig. 2 shows the hose in expanded position in which it is molded to its final form, Fig. 2 also showing the construction of the mold and mandrel when multiple sections are to be formed thereon.

Fig. 3 shows a transverse section of the fluted portion of the mandrel with the rubber body contracted thereagainst.

Fig. 4 shows a fragmentary view of the covered reenforcing member.

Fig. 5 shows a side view of the clamp member.

Fig. 6 shows an end view of the clamp member.

Fig. 7 shows a sectional view of the mold taken along line 7—7 of Fig. 1, showing the molding of the attaching portion with the clamp in expanded relation.

In carrying out the present invention a tube of elastomeric material (such as rubber—natural or synthetic—or thermoplastic resins which may be molded under heat and pressure, for example, polyethylene, polyamides, vinyl polymers, copolymers and the like, the particular requirement of the hose determining the composition thereof) to form the body 10 of the hose is inserted over a mandrel 11 having at each end thereof a cylindrical portion 12 adapted to fit within the bore and of such a length as to form the attaching portion for the hose.

In the herein illustrated form of the invention, the remainder of the mandrel between the cylindrical portions is longitudinally fluted as shown at 13 in Figs. 1 and 3, with the flutes having grooves 14 in the bottom thereof communicating by a passage 15 with a bore 16 in the end of the mandrel. After the tube is inserted over the mandrel, suction is applied to the bore 16 from a suitable line 17 connected to the bore which draws the body 10 into engagement with the surface of the flutes of the mandrel as shown in Fig. 4. This securely holds the material in place and permits the mandrel and body to be inserted in a helical reenforcing member 18 which extends along the body between the attaching portions.

In the preferred form of the invention the helical reenforcing member comprises a helical spring wire 19 having an elastomeric cover 20 thereon as shown in Fig. 4. The cover can be formed by dipping, spraying, or by covering it with sheet material as desired. The ends 18a of the reenforcing member are secured by tape 21 to the body at a point overlying the end of the cylindrical portion of the mandrel for forming the attaching portion of the hose. The suction is removed and the elastomeric body permitted to return to its normal position in which it engages the inner surface of the convolutions of the reenforcing member, as shown in Fig. 1, and to properly position them therealong. A layer 22 of elastomeric material is then provided around the end portion of the body so as to form a heavy attaching portion for the hose. The mandrel is then inserted in a two-part mold 23, 24 having a cavity 25 therein provided on its outer wall with a helical groove 26. The mandrel has a groove 27 therearound cooperating with flanges 28 on the mold to properly locate the mandrel in position in which the coils of the reenforcing member are positioned between the grooves as shown in Fig. 1. Fluid pressure is then applied to the bore 16 and along the fluted section of the mandrel to act on the inner surface of the body to force the elastomeric material outwardly and extend it into the grooves to form the corrugations therein and to secure it to the reenforcing member so that the convolutions of the reenforcing member 18 are disposed in the troughs of the corrugations while the crest are free of any stiffness. The mold is heated and the elastomeric material vulcanized or set in the corrugated form of the mold so as to produce the elastomeric hose having reenforcing means in the trough of the corrugations and unreenforced, readily flexible crests of the corrugation to permit elongation and manipulation of the hose.

While in some circumstances where a thin wall is required, it may be desired to further reenforce the light wall by providing stockinet or the like stretchable material which is embedded in the body 10, the body is herein illustrated as formed only of elastomeric material and the term as used herein includes construction where the body is made solely of elastomeric material or where it includes a reenforcement as of stockinet.

Under some circumstances, it may be desired to mold a plurality of hose on a single elongate mandrel. When this is the case, the elongate mandrel is provided with cylindrical sleeves 29, as shown in Fig. 2, which are spaced along the mandrel at the points where it is desired to form the attaching portions of adjacent hose sections. After the hose has been completed, the sections are severed at the midpoint of each of the intermediate attaching portions.

It is at present preferred to provide the hose with a novel clamping means formed integrally with the attaching portion which will provide a clamping action for the attaching portion when mounting the hose on a connector. This is accomplished by providing a clamp 30, such as shown in Figs. 5 and 6, which comprises two convolutions 31, 32 of spring wire of opposite pitch having their ends overlapped and terminating in outwardly projecting arms 31a, 31b, 32a, 32b, the inner arms 31a, 32a being juxtaposed and the outer arms 31b, 32b being connected together. The projecting arms permit the coils to be expanded from the contracted position shown in dash lines in Fig. 5 to the expanded position as shown in full lines by moving the arms 31a, 32a toward the arms 31b, 32b. If desired, the outer arms can be provided with notches 33 on their inner surfaces to engage the inner arms 31a, 32a and hold them in the expanded position of Fig. 5. The clamp is incorporated into the hose by being positioned, while in expanded condition, around the body overlying the cylindrical portion of the mandrel as shown in Figs. 1, 2 and 7. The elastomeric layer is wrapped over and around the clamp in such a manner that the arms 31a, 32a, 31b and 32b project outwardly beyond the surface of the attaching portion so that they can be grasped in order to manipulate the clamp.

If desired, the clamp can be provided with a coating of talc or other material, or the body and layer of elastomeric material can be provided with polyethylene or other material which will prevent adhesion of the elastomeric material to the metal of the clip so that the clip is, in effect, positioned in a pocket in the attaching portion.

As shown in Fig. 7, a suitable core 34 is positioned in the mold between the arms to prevent rubber from flowing between.

After the hose is molded and removed from the mold, the inner arms are released from the notches so that the clamp contracts and causes the attaching portion, when in telescoping relation, to grip the connector. When it is desired to slip the hose into telescoping relation with the connector, the two arms are moved together to expand the clamp and the attaching portion, thus facilitating the insertion of the same over the connector. Thereafter, the arms are released from the notches and the clamp automatically contracts the attaching portion into engagement with the connector. By the use of the pair of spring members having an opposite pitch, it has been found that a better clamping action is achieved because the clamp not only presses the material of the sleeve under the coils against the connector, but also compacts it between the convolutions as well so as to force it against the connector to produce a more effective seal.

It will be seen, therefore, that the present invention provides a novel molded hose construction having a spirally corrugated body provided with a reenforcement in the troughs in the spiral corrugations and in which the crests of the corrugations are an expanded elastomer without having a reenforcement therein to provide a soft, flexible construction which readily permits manipulation of the hose. Further, the hose is provided with a novel clamping arrangement by which the attaching portions of the hose can be quickly moved into telescopic relation with a connector and can be released to clamp the attaching portion to the connector.

Variations and modifications may be made within the scope of the claims and portions of the improvements may be used without others.

We claim:

1. A hose having at each end thereof an attaching portion for connecting said hose to a rigid tubular connector and comprising a sleeve formed of elastomeric material, and an annular expansible and contractible clamping member having the annular portions thereof completely embedded in said sleeve and comprising two coils of opposite pitch, each coil having their ends overlapped and terminating in outwardly projecting arms extending beyond the sides of the sleeve, said coils being positioned in side by side relation with their inner arms in juxtaposition and the outer arms connected together, said arms enabling said clamping member to be operated to expand when telescoping the sleeve and connector, and said clamping member contracting to clamp the sleeve to the connector to form a seal therewith.

2. A hose having at each end thereof an attaching portion for connecting said hose to a rigid tubular connector and comprising a sleeve formed of elastomeric material, and an annular expansible and contractible clamping member having the annular portions thereof completely embedded in said sleeve and comprising two coils of opposite pitch, each coil having their ends overlapped and terminating in outwardly projecting arms extending outwardly beyond the sides of the sleeves, said coils being positioned in side by side relation with the inner arms in juxtaposition and the outer arms connected together, the coils adjacent the outer arms having notches on their inner surfaces to engage and hold the inner arms when said inner and outer arms are moved toward one another to expand said coils and sleeve when telescoping the sleeve and connector, and said clamping member contracting when the inner arms are released from the notches to clamp the sleeve to the connector to form a seal therewith.

3. A hose having at each end thereof an attaching portion for a hose or the like fluid container for connecting said hose to a rigid tubular connector, comprising a sleeve formed of elastomeric material having an annular closed pocket therein, and an annular expansible and contractible clamping member disposed in said pocket and comprising two coils of opposite pitch, each coil having their ends overlapped and terminating in outwardly projecting arms extending beyond the sides of the sleeve, said coils being positioned in side by side relation with the inner arms in juxtaposition and the outer arms connected together, said arms enabling said clamping member to be operated to expand the coils and sleeve when telescoping the sleeve and connector, and said coils contracting to clamp the sleeve to the connector to form a seal therewith.

4. In a hose provided with helically corrugated body having at each end thereof an attaching portion for connecting said hose to a rigid tubular connector and having a helical reenforcing member extending between and secured to said attaching portions and having the coils thereof disposed in the troughs of the corrugations, said attaching portions comprising a sleeve formed of elastomeric material, the improvement wherein and annular expansible and contractible clamping member embedded within and enclosed by said sleeve comprises two coils of opposite pitch, each coil having their ends overlapped and terminating in outwardly projecting arms extending beyond the sides of the sleeve, said coils being positioned in side by side relation with the inner arms in juxtaposition and the outer arms connected together, said arms enabling said clamping member to be operated to expand when telescoping the sleeve and connector, and said clamping member contracting to clamp the sleeve to the connector to form a seal therewith.

5. An attaching portion for a hose or the like fluid container for connecting said hose to a rigid tubular connector and comprising a sleeve formed of elastomeric material, and an annular expansible and contractible clamping member having the annular portions thereof completely embedded in said sleeve and comprising two coils of opposite pitch, each coil having their ends overlapped and terminating in outwardly projecting arms extending beyond the sides of the sleeve, said coils being positioned in side by side relation with their inner arms in juxtaposition and the outer arms connected together, said arms enabling said clamping member to be operated to expand when telescoping the sleeve and connector, and said clamping member contracting to clamp the sleeve to the connector to form a seal therewith.

6. An attaching portion for a hose or the like fluid container for connecting said hose to a rigid tubular connector and comprising a sleeve formed of elastomeric material, and an annular expansible and contractible clamping member having the annular portions thereof completely embedded in said sleeve and comprising two coils of opposite pitch, each coil having their ends overlapped and terminating in outwardly projecting arms extending outwardly beyond the sides of the sleeve, said coils being positioned in side by side relation with the inner arms in juxtaposition and the outer arms connected together, the coils adjacent the outer arms having notches on their inner surfaces to engage and hold the inner arms when said inner and outer arms are moved toward one another to expand said coils and sleeve when telescoping the sleeve and connector, and said clamping member contracting when the inner arms are released from the notches to clamp the sleeve to the connector to form a seal therewith.

7. In a hose provided with a helically corrugated metal reenforced body having at each end thereof an attaching portion for connecting said hose to a rigid tubular connector, said attaching portion comprising a sleeve formed of elastomeric material, the improvement wherein an annular expansible and contractible clamping member is embedded within and enclosed by said sleeve and comprises two coils of resilient wire, each coil having their ends overlapped and terminating in a pair of outwardly projecting arms extending beyond the sides of the sleeve, said coils being positioned in side by side relation with at least one of the arms of each pair being connected together, said arms enabling said clamping member to be operated to expand when telescoping the sleeve and connector, and said clamping member contracting to clamp the sleeve to the connector to form a seal therewith.

References Cited in the file of this patent

UNITED STATES PATENTS

| | | |
|---|---|---|
| 1,324,850 | Roberts | Dec. 16, 1919 |
| 1,746,701 | Kimmich | Feb. 11, 1930 |
| 2,122,925 | Bins | July 5, 1938 |
| 2,147,963 | Casciotti | Feb. 21, 1939 |
| 2,315,225 | Rogers | Mar. 30, 1943 |
| 2,396,059 | Roberts | Mar. 5, 1946 |
| 2,447,697 | Gotschall | Aug. 24, 1948 |
| 2,472,172 | Ovens et al. | June 7, 1949 |
| 2,560,369 | Roberts | July 10, 1951 |
| 2,629,908 | Keck | Mar. 3, 1953 |
| 2,713,381 | Seck | July 19, 1955 |
| 2,715,914 | Roberts | Aug. 23, 1955 |
| 2,810,593 | Petoskey | Oct. 22, 1957 |

FOREIGN PATENTS

| | | |
|---|---|---|
| 86,062 | Switzerland | Aug. 2, 1920 |
| 328,806 | Germany | Nov. 5, 1920 |